United States Patent Office 3,481,981
Patented Dec. 2, 1969

3,481,981
1,1-DIPHENYL-2-METHYL-3-ALKYLIDENEAMINO-
1-PROPANOLS
Robert B. Moffett, Kalamazoo, Mich., assignor to The Upjohn Company, Kalamazoo, Mich., a corporation of Delaware
No Drawing. Continuation-in-part of application Ser. No. 392,301, Aug. 26, 1964. This application Nov. 23, 1966, Ser. No. 596,419
Int. Cl. C07c *119/06, 91/16;* A61k *27/00*
U.S. Cl. 260—566                                     2 Claims

ABSTRACT OF THE DISCLOSURE

A compound of the formula:

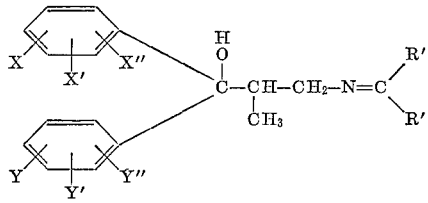

wherein R is hydrogen or lower-alkyl containing from one to five carbon atoms, R' is lower-alkyl containing from one to five carbon atoms, X, X', X'', Y, Y', and Y'' are hydrogen, lower-alkyl containing from one to four carbon atoms, lower alkoxy containing from one to four carbon atoms or halogen having CNS stimulating and anorexigenic activity and having a longer duration of action and fewer side effects than the corresponding primary amine.

---

This application is a continuation-in-part of copending application Ser. No. 392,301 filed Aug. 26, 1964.

This invention relates to new and useful compounds and more particularly the invention relates to compounds having the formula:

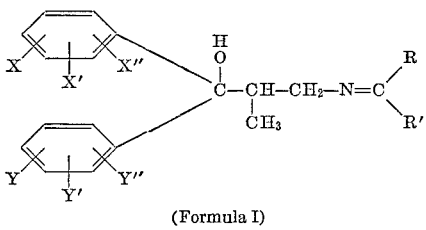

(Formula I)

wherein R is hydrogen or lower-alkyl containing from one to five carbon atoms, inclusive, R' is lower-alkyl containing from one to five carbon atoms, inclusive, X, X', X'', Y, Y', and Y'' are hydrogen, lower-alkyl containing from one to four carbon atoms, inclusive, lower-alkoxy containing from one to four carbon atoms, inclusive, or halogen.

Examples of lower-alkyl are methyl, ethyl, propyl, butyl, and pentyl, including isomeric forms thereof. Examples of lower-alkoxy are methoxy, ethoxy, propoxy, and butoxy, including isomeric forms thereof. The term "halogen" is inclusive of fluorine, chlorine, bromine, and iodine.

The compounds of Formula I can be prepared by reacting a 1,1-diphenyl-2-methyl-3-aminopropanol of Formula II with an aldehyde or ketone of Formula III, in accordance with the equation:

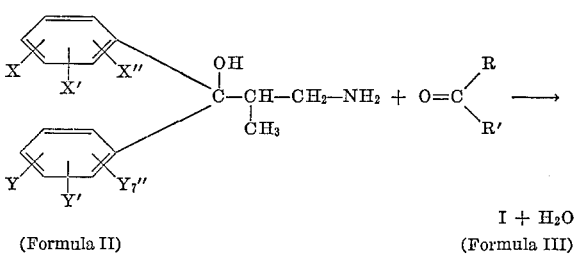

wherein X, X', X'', Y, Y', Y'', R, and R' are as given above.

The Formula II primary amine (unsubstituted or having benzene ring substitution) is reacted with the Formula III aldehyde or ketone in accordance with procedures known in the art for the preparation of Schiff bases. Illustratively, the reaction is carried out in the presence of a water-immiscible, inert solvent such as benzene, toluene, xylene, and the like, at the boiling point of the reaction mixture and azeotropically removing the water formed during the reaction. The reactants can be employed in substantially equimolar amounts or an excess of either reactant can be employed if so desired. Upon completion of the reaction, the compound of Formula I can be isolated and purified by conventional methods, for example, by evaporating the mixture to dryness and crystallizing the residue from a solvent such as methanol, ethanol, 1-propanol, 2-propanol, acetone, ethyl acetate and the like, or by chromatography, fractional crystallization, or combinations of such methods.

Alternatively, in many instances the desired reaction can be effected merely by mixing the Formula II primary amine with a substantial excess of the Formula III compound at temperatures ranging between about 50° C. and about 100° C. This procedure is particularly applicable and convenient when a ketone reactant is employed, such as acetone, methyl ethyl ketone, or diethyl ketone. The resulting Formula I Schiff base can be obtained in conventional manner, e.g., by concentrating the solution, cooling, and filtering.

The 1,1-diphenyl-2-methyl-3-aminopropanols (Formula II above) can be prepared as disclosed in Spanish Patent No. 316,517 issued Jan. 27, 1966 and Belgian Patent No. 668,835 issued Feb. 28, 1966.

The compounds of the Formula I are useful in preparing the corresponding secondary amines by catalytic hydrogenation or by reduction with sodium borohydride. The secondary amines, so prepared, can then be used as disclosed in the above cited Spanish and Belgian patents.

The compounds of the Formula I have pharmacological activities similar to those exhibited by the corresponding Formula II primary amines from which they are derived and can be used for the same purposes, e.g., the compounds of the Formula I elicit central nervous system (CNS) stimulatory and anorexigenic effects. The compounds of the Formula I differ from the corresponding primary amines in that they are longer acting and have fewer side effects. For example, 1,1-diphenyl-2-methyl-3-(isopropylidineamino)propanol is less toxic, shows less gross stimulation and is more active as an anorexigenic than 1,1-diphenyl-2-methyl - 3 - aminopropanol hydrochloride.

EXAMPLE 1

1,1-diphenyl-2-methyl-3-(isopropylidineamino)propanol 12.1 grams (0.05 mole) of 1,1-diphenyl-2-methyl-3-amino-propanol was dissolved in 75 ml. of acetone near the boiling point. The solution was filtered and concentrated (by boiling) to 50 ml., giving on cooling, 11.1 grams (79% theory) 1,1-diphenyl-2-methyl-3-(isopropylidineamino)propanol as white crystals having a melting point of 135.5-137.5° C.

*Analysis.*—Calcd. for $C_{19}H_{23}NO$: C, 81.10; H, 8.24; N, 4.98. Found: C, 80.79; H, 8.23; N, 5.04.

EXAMPLE 2

Following the procedure of the preceding Example 1 but substituting an equimolar amount of:

1,1-bis(2-bromophenyl)-2-methyl-3-aminopropanol,
1,1-bis(3-bromophenyl)-2-methyl-3-aminopropanol,
1-phenyl-1-(2-chlorophenyl)-2-methyl-3-aminopropanol,
1,1-bis(4-chlorophenyl)-2-methyl-3-aminopropanol,
1,1-bis(2-iodophenyl)-2-methyl-3-aminopropanol,
1-phenyl-1-(4-fluorophenyl)-2-methyl-3-aminopropanol,
1-phenyl-1-(3-iodophenyl)-2-methyl-3-aminopropanol,
1-phenyl-1-(2-methylphenyl)-2-methyl-3-aminopropanol,
1-phenyl-1-(3-bromo-4-methylphenyl)-2-methyl-3-aminopropanol,
1-(2-bromophenyl)-1-(4-methylphenyl)-2-methyl-3-aminopropanol,
1-(4-bromophenyl)-1-(4-ethoxyphenyl)-2-methyl-3-aminopropanol,
1-(2-methoxy-5-methylphenyl)-1-(2-bromophenyl)-2-methyl-3-aminopropanol,
1-phenyl-1-(4-propylphenyl)-2-methyl-3-aminopropanol,
1-phenyl-1-(2-,4,5-trimethylphenyl)-2-methyl-3-aminopropanol,
1,1-bis(4-methoxyphenyl)-2-methyl-3-aminopropanol,
1-phenyl-1-(4-propoxyphenyl)-2-methyl-3-aminopropanol,
1-phenyl-1(2,4,5-trimethoxyphenyl)-2-methyl-3-aminopropanol,
1,1-bis(2,4-dimethoxyphenyl)-2-methyl-3-aminopropanol,
1,1-bis(3,4-dimethoxyphenyl)-2-methyl-3-aminopropanol,
1,1-bis(2,4,5-trimethoxyphenyl)-2-methyl-3-aminopropanol,
1-(2,4,6-trimethoxyphenyl)-1-(3,4,5-trimethoxyphenyl)-2-methyl-3-aminopropanol,
1-phenyl-1-(3-fluorophenyl)-2-methyl-3-aminopropanol,
1,1-bis(4-fluorophenyl)-2-methyl-3-aminopropanol, and
1,1-bis(3-fluorophenyl)-2-methyl-3-aminopropanol for the 1,1-diphenyl-2-methyl-3-aminopropanol of the example there can be respectively obtained:

1,1-bis(2-bromopheinyl)-2-methyl-3-(isopropylideneamino)propanol,
1,1-bis(3-bromophenyl)-2-methyl-3-(isopropylideneamino)propanol,
1-phenyl-1-(2-chlorophenyl)-2-methyl-3-(isopropylideneamino)propanol,
1,1-bis(4-chlorophenyl)-2-methyl-3-(isopropylideneamino)propanol,
1,1-bis(2-iodophenyl)-2-methyl-3-(isopropylideneamino)propanol,
1-phenyl-1-(4-fluorophenyl)-2-methyl-3-(isopropylideneamino)propanol,
1-phenyl-1-(3-iodophenyl)-2-methyl-3-(isopropylideneamino)propanol,
1-phenyl-1-(2-methylphenyl)-2-methyl-3-(isopropylideneanimo)propanol,
1-phenyl-1-(3-bromo-4-methylphenyl)-2-methyl-3-(isopropylideneamino)propanol,
1-(2-bromophenyl)-1-(4-methylphenyl)-2-methyl-3-(isopropylideneamino)propanol,
1-(4-bromophenyl)-1-(4-ethoxyphenyl)-2-methyl-3-(isopropylideneamino)propanol,
1-(2-methoxy-5-methylphenyl)-1-(2-bromophenyl)-2-methyl-3-(isopropylideneamino)propanol,
1-phenyl-1-(4-propylphenyl)-2-methyl-3-(isopropylideneamino)propanol,
1-phenyl-1-(2,4,5-trimethylphenyl)-2-methyl-3-(isopropylideneamino)propanol,
1,1-bis(4-methoxyphenyl)-2-methyl-3-(isopropylideneamino)propanol,
1-phenyl-1-(4-propoxyphenyl)-2-methyl-3-(isopropylideneamino)propanol,
1-phenyl-1-(2,4,5-trimethoxyphenyl)-2-methyl-3-(isopropylideneamino)propanol,
1,1-bis(2-,4-dimethoxyphenyl)-2-methyl-3-(isopropylideneamino)propanol,
1,1-bis(3,4-dimethoxyphenyl)-2-methyl-3-(isopropylideneamino)propanol,
1,1-bis(2,4,5-trimethoxyphenyl)-2-methyl-3-(isopropylideneamino)propanol,
1-(2,4,6-trimethoxyphenyl)-1-(3,4,5-trimethoxyphenyl)-2-methyl-3-(isopropylideneamino)propanol,
1-phenyl-1-(3-fluorophenyl)-2-methyl-3-(isopropylideneamino)propanol,
1,1-bis(4-fluorophenyl)-2-methyl-3-(isopropylideneamino)propanol, and
1,1-bis(3-fluorophenyl)-2-methyl-3-(isopropylideneamino)propanol.

EXAMPLE 3

A benzene solution containing approximately equimolar aomunts of 1,1-diphenyl-2-methyl-3-aminopropanol and acetaldehyde can be refluxed (using a Dean-Stark trap), and after removal of approximately the theoretical amount of water, the solution can be evaporated to dryness under reduced pressure to obtain 1,1-diphenyl-2-methyl-3-(ethylideneamino)propanol.

Following the above procedure, substituting for acetaldehyde an equimolar amount each of: propionaldehyde, butyraldehyde, isobutyraldehyde, valeraldehyde, 2-methylbutyraldehyde, caproaldehyde, diethyl ketone, dipropyl ketone, diisopropyl ketone, dibutyl ketone, diphentyl ketone, methyl ethyl ketone, methyl sec.butyl ketone, methyl neopentyl ketone, and methyl isopropyl ketone there can be respectively obtained:

1,1-diphenyl-2-methyl-3-(propylideneamino)propanol,
1,1-diphenyl-2-methyl-3-(butylideneamino)propanol,
1,1-diphenyl-2-methyl-3-(isobutylideneamino)propanol,
1,1-diphenyl-2-methyl-3-(pentylideneamino)propanol,
1,1-diphenyl-2-methyl-3-(2-mehtylbutylideneamino)propanol,
1,1-diphenyl-2-methyl-3-(hexylideneamino)propanol,
1,1-diphenyl-2-methyl-3-(1-ethylpropylideneamino)propanol,
1,1-diphenyl-2-methyl-3-(1-propylbutylideneamino)propanol,
1,1-diphenyl-2-methyl-3-(1-isopropyl-2-methylpropylideneamino)propanol,
1,1-diphenyl-2-methyl-3-(1-butylpentylideneamino)propanol,
1,1-diphenyl-2-methyl-3-(1-pentylhexylideneamino)propanol,
1,1-diphenyl-2-methyl-3-(sec.butylideneamino)propanol,
(1,2-dimethylbutylideneamino)propanol,
1,1-diphenyl-2-methyl-3-(1,3,3-trimethylbutylideneamino)propanol, and
1,1-diphenyl-2-methyl-3-(1,2-dimethylpropylideneamino)propanol.

What is claimed is:
1. A compound of the formula

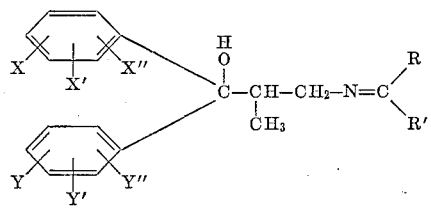

wherein R is hydrogen or lower alkyl containing from one to five carbon atoms, inclusive, R' is lower-alkyl containing from one to five carbon atoms, inclusive, X, X', X", Y, Y', and Y" are hydrogen, lower-alkyl containing from 1 to 4 carbon atoms, inclusive, lower-alkoxy containing from 1 to 4 carbon atoms, inclusive, or halogen.

2. A compound according to claim 1 which is 1,1-diphenyl-2-methyl-3-(isopropylideneamino)-1-propanol.

References Cited

UNITED STATES PATENTS 2,422,013 6/1947 Haury et al. _____ 260—566

FOREIGN PATENTS 811,659 4/1959 Great Britain.
936,041 9/1963 Great Britain.

ROBERT V. HINES, Primary Examiner

U.S. Cl. X.R.

260—570, 999